(12) United States Patent
Ma et al.

(10) Patent No.: US 12,177,857 B2
(45) Date of Patent: Dec. 24, 2024

(54) BANDWIDTH PART (BWP) CONFIGURATION WITH A SHARED PARTIAL CONFIGURATION FOR NON-TERRESTRIAL NETWORKS (NTNs)

(71) Applicant: QUALCOMM Incorporated, San Diego, CA (US)

(72) Inventors: Liangping Ma, San Diego, CA (US); Ayan Sengupta, San Diego, CA (US); Xiao Feng Wang, San Diego, CA (US); Peter Pui Lok Ang, San Diego, CA (US); Alberto Rico Alvarino, San Diego, CA (US); Bharat Shrestha, San Diego, CA (US); Umesh Phuyal, San Diego, CA (US); Jun Ma, San Diego, CA (US); Peter Gaal, San Diego, CA (US); Dan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 241 days.

(21) Appl. No.: 17/390,718

(22) Filed: Jul. 30, 2021

(65) Prior Publication Data
US 2022/0046612 A1    Feb. 10, 2022

Related U.S. Application Data

(60) Provisional application No. 63/062,294, filed on Aug. 6, 2020.

(51) Int. Cl.
*H04W 72/23*    (2023.01)
*H04W 72/044*   (2023.01)
(Continued)

(52) U.S. Cl.
CPC ....... *H04W 72/23* (2023.01); *H04W 72/0453* (2013.01); *H04W 72/046* (2013.01); *H04W 84/06* (2013.01)

(58) Field of Classification Search
CPC ............. H04W 72/23; H04W 72/0453; H04W 72/046; H04W 84/06; H04L 5/0094; H04B 7/1851
See application file for complete search history.

(56) References Cited

U.S. PATENT DOCUMENTS

| 2018/0192426 A1* | 7/2018 | Ryoo | .............. H04W 36/0055 |
| 2019/0132855 A1* | 5/2019 | Lee  | .................. H04W 72/1268 |

(Continued)

FOREIGN PATENT DOCUMENTS

| EP | 3790329 A1 | 3/2021 |
| WO | 2019074338 A1 | 4/2019 |
| WO | 2019210521 A1 | 11/2019 |

OTHER PUBLICATIONS

International Search Report and Written Opinion—PCT/US2021/044227—ISA/EPO—Nov. 9, 2021.
(Continued)

*Primary Examiner* — Christine Ng
(74) *Attorney, Agent, or Firm* — Seyfarth Shaw LLP

(57) ABSTRACT

A method for wireless communication performed by a user equipment (UE) includes receiving a first message comprising a configuration for reconstructing a bandwidth part (BWP) for a network entity. The BWP may be used on a non-terrestrial beam of a non-terrestrial entity. The method also includes reconstructing a BWP of the BWPs based on the configuration. The method further includes switching from a current BWP to the reconstructed BWP to communicate with the network entity, e.g., non-terrestrial entity.

30 Claims, 7 Drawing Sheets

(51) Int. Cl.
*H04W 72/0453* (2023.01)
*H04W 84/06* (2009.01)

(56) References Cited

U.S. PATENT DOCUMENTS

| | | | |
|---|---|---|---|
| 2019/0261425 A1 | 8/2019 | Park et al. | |
| 2019/0297514 A1* | 9/2019 | Pao | H04W 36/06 |
| 2020/0045702 A1* | 2/2020 | Chen | H04W 72/0453 |
| 2020/0052782 A1 | 2/2020 | Wang et al. | |
| 2020/0229241 A1* | 7/2020 | Jeon | H04W 74/0833 |
| 2020/0266959 A1 | 8/2020 | Yi et al. | |
| 2021/0051575 A1* | 2/2021 | Yang | H04W 48/12 |
| 2021/0058145 A1* | 2/2021 | Alasti | H04W 36/30 |
| 2021/0076445 A1* | 3/2021 | Tsai | H04L 5/003 |
| 2021/0204214 A1* | 7/2021 | Chang | H04W 72/1263 |

OTHER PUBLICATIONS

QUALCOMM Incorporated: "Discussion on Common SCell Configuration", 3GPP Draft, R2-1912196—Discussion on Common Scell Configuration, 3rd Generation Partnership Project (3GPP), Chongqing, China, Oct. 14-18, 2019, pp. 1-6, Oct. 4, 2019 (Oct. 4, 2019), XP051804370, Retrieved from the Internet: URL: https://ftp.3gpp.org/tsg_ran/WG2_RL2/TSGR2_107bis/Docs/R2-1912196.zip R2-1912196—Discussion on common SCell configuration.doc [retrieved on Oct. 4, 2019].

* cited by examiner

BANDWIDTH PART (BWP) CONFIGURATION WITH A SHARED PARTIAL CONFIGURATION FOR NON-TERRESTRIAL NETWORKS (NTNs)

CROSS-REFERENCE TO RELATED APPLICATION

The present application claims the benefit of U.S. Provisional Patent Application No. 63/062,294, filed on Aug. 6, 2020, and titled "BANDWIDTH PART (BWP) CONFIGURATION WITH A SHARED PARTIAL CONFIGURATION FOR NON-TERRESTRIAL NETWORKS (NTNs)," the disclosure of which is expressly incorporated by reference in its entirety.

FIELD OF THE DISCLOSURE

Aspects of the present disclosure generally relate to wireless communications, and more particularly to techniques and apparatuses for bandwidth part (BWP) configuration with a shared partial configuration for non-terrestrial networks (NTNs).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

According to aspects of the present disclosure, a method performed by a user equipment (UE) receives a first message that includes a configuration for reconstructing a bandwidth part (BWP) for a network device. The method also reconstructs the BWP based on the configuration. The method further switches from a current BWP to the reconstructed BWP to communicate with the network device.

In other aspects of the present disclosure, an apparatus for wireless communications performed by a user equipment (UE) includes a processor and memory coupled with the processor. Instructions stored in the memory are operable, when executed by the processor, to cause the apparatus to receive a first message that includes a configuration to reconstruct a bandwidth part (BWP) for a network device. The apparatus can also reconstruct the BWP based on the configuration. The apparatus can further switch from a current BWP to the reconstructed BWP to communicate with the network device.

In other aspects of the present disclosure, a user equipment (UE) includes means for receiving a first message comprising a configuration for reconstructing a bandwidth part (BWP) for network device. The UE also includes means for reconstructing the BWP based on the configuration. The UE further includes means for switching from a current BWP to the reconstructed BWP to communicate with the network device.

In other aspects of the present disclosure, a non-transitory computer-readable medium with program code recorded thereon is disclosed. The program code is executed by a user equipment (UE) and includes program code to receive a first message that includes a configuration to reconstruct a bandwidth part (BWP) for a network device. The UE also includes program code to reconstruct the BWP based on the configuration. The further includes program code to switch from a current BWP to the reconstructed BWP to communicate with the network device y.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
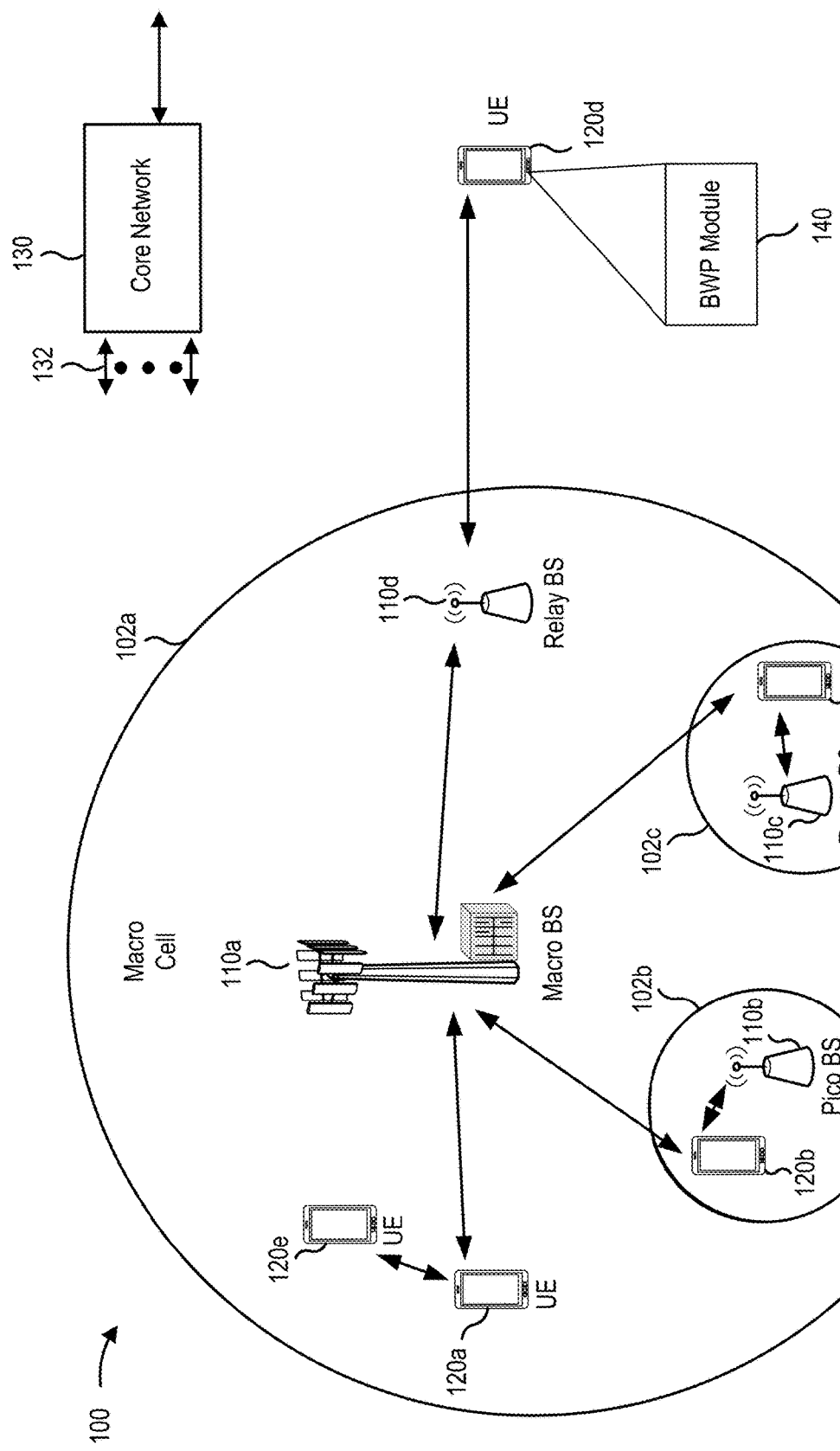
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In some cases, a user equipment (UE) and a non-terrestrial entity may transmit control information or data messages using one or more beams associated with one or more bandwidth parts (BWPs). In some examples, the non-terrestrial entity may be a satellite or a high altitude platform station (HAPS). In one example, the non-terrestrial entity and the UE may be thousands of kilometers apart. Due to the distance between the non-terrestrial entity and the UE, a transmission from the non-terrestrial entity may degrade due to, for example, atmospheric effects, interference from other radio frequency sources, signal attenuation due to vegetation or structures, and the like. Due to the mobility of the non-terrestrial entity and/or signal degradation, the UE may frequently switch beams. In some cases, for each beam, one or more BWPs may be configured to accommodate different UE capabilities.

The BWP configurations may be signaled to the UE during a cell search operation. The BWP configuration may provide one or more downlink beam parameters, such as frequency location and bandwidth, a subcarrier spacing, cyclic prefix duration, cell specific downlink control channel resources (e.g., control resource set (CORSET) zero, search space zero), and/or a time-domain resource allocation for a downlink shared channel (e.g., a starting time and duration for a physical downlink shared channel (PDSCH)). The BWP configuration may provide an uplink shared channel configuration (e.g., time-domain resource allocation patterns), as well as similar uplink beam parameters. Additionally, the BWP configuration may configure multiple options for a parameter. The selection or activation of a particular option may be provided via control signaling, such as downlink control information (DCI), a medium access control (MAC) control element (CE), or radio resource control (RRC) signaling. That is, the BWP configuration may configure multiple time-domain resource allocation patterns for downlink shared channels, and one of the configured time-domain resource allocation patterns may be selected via DCI signaling.

The multiple BWP configurations may increase signaling and increase resources used by the UE. Therefore, it is desirable to improve BWP configuration signaling. According to aspects of the present disclosure, a UE receives a configuration for reconstructing a bandwidth part (BWP) of multiple BWPs of a non-terrestrial entity. The configuration for reconstructing the BWP may be referred to as a BWP configuration. The UE may reconstruct one of the BWPs based on the BWP configuration. Furthermore, the UE may switch from a current BWP to the reconstructed BWP to communicate with the non-terrestrial entity. The BWP configuration may be received in a radio resource control (RRC) message or a system information block (SIB) message.

In some cases, the BWP configuration may be an initial BWP configuration. For example, the network entity may configure an initial downlink BWP and/or an initial uplink BWP. In some other cases, the BWP configuration (e.g., including a downlink BWP or an uplink BWP configuration) may correspond to a reference BWP. In still other cases, the BWP configuration may correspond to a shared partial BWP configuration. The shared partial BWP configuration may include a shared common part and a shared dedicated part.

The BWP configuration may be for a first non-terrestrial beam from the non-terrestrial entity. In some aspects, the non-terrestrial entity is currently serving the UE via the first non-terrestrial beam. In other aspects, the non-terrestrial entity is currently serving the UE via a second non-terrestrial beam, and the first non-terrestrial beam is one of multiple non-terrestrial beams of the non-terrestrial entity. In another configuration, the non-terrestrial entity is not serving the UE at a time when the BWP configuration is received.

The UE may also receive an indication for transforming the BWP based on the shared partial BWP configuration and one or more parameters independent of the shared partial BWP configuration. The transformation may include a frequency offset. In one example, the BWP is reconstructed by applying the frequency offset to a frequency of the shared partial BWP configuration.

As described, the UE may receive multiple BWP configurations. In one implementation, the shared partial BWP configuration is one shared partial BWP configuration of multiple shared BWP configurations. Each of the multiple shared partial BWP configurations is associated with a unique identifier. The UE may receive an identifier identifying the shared partial BWP configuration.

In one implementation, the UE switches to the reconstructed BWP before expiration of a timer. The timer may include a first value when the current BWP and the reconstructed BWP have a same shared partial BWP configuration. Additionally, the timer may include a second value when the current BWP and the reconstructed BWP have different shared partial BWP configurations. The first value is equal to or less than the second value. A value of the timer may be based on one or more information elements of the shared partial BWP configuration of the reconstructed BWP, whether the switch from the current BWP to the reconstructed BWP is an intra-beam switch or an inter-beam switch, and a UE capability.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a packet data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by a session management session (SMF).

The UEs 120 may include a bandwidth part (BWP) module 140. For brevity, only one UE 120d is shown as including the BWP module 140. The BWP module 140 may receive a first message comprising a configuration for reconstructing a bandwidth part (BWP) of a number of BWPs for a network device, such as a non-terrestrial entity. The BWP module 140 may also reconstruct a BWP of the number of BWPs based the configuration. The BWP module 140 may further switch from a current BWP to the reconstructed BWP to communicate with the network device.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
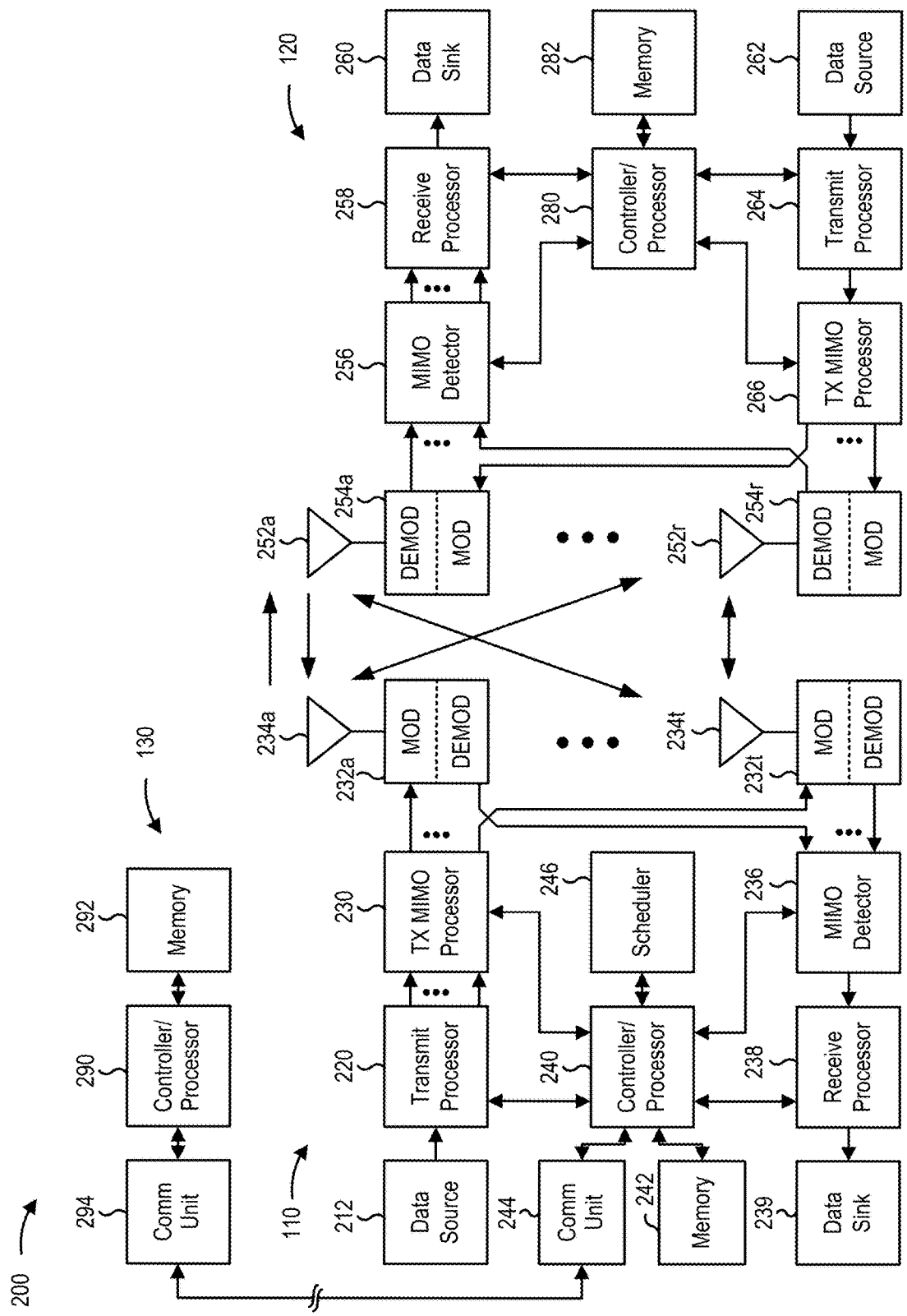
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, down-convert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with bandwidth part (BWP) reconstruction based on a received BWP configuration as described in more detail elsewhere. For example, the controller/processor 240 of the base station 110, the controller/processor 280 of the UE 120, and/or any other component(s) of FIG. 2 may perform or direct operations of, for example, the process of FIG. 7 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving a first message comprising a configuration for reconstructing a bandwidth part (BWP) of a number of BWPs for a first non-terrestrial beam of an non-terrestrial entity; means for reconstructing a BWP of the number of BWPs based the configuration; and means for switching from a current BWP to the reconstructed BWP to communicate with the non-terrestrial entity. Such means may include one or more components of the UE 120 described in connection with FIG. 2.

As indicated above, FIG. 2 is provided merely as an example. Other examples may differ from what is described with regard to FIG. 2.

Figure 3:
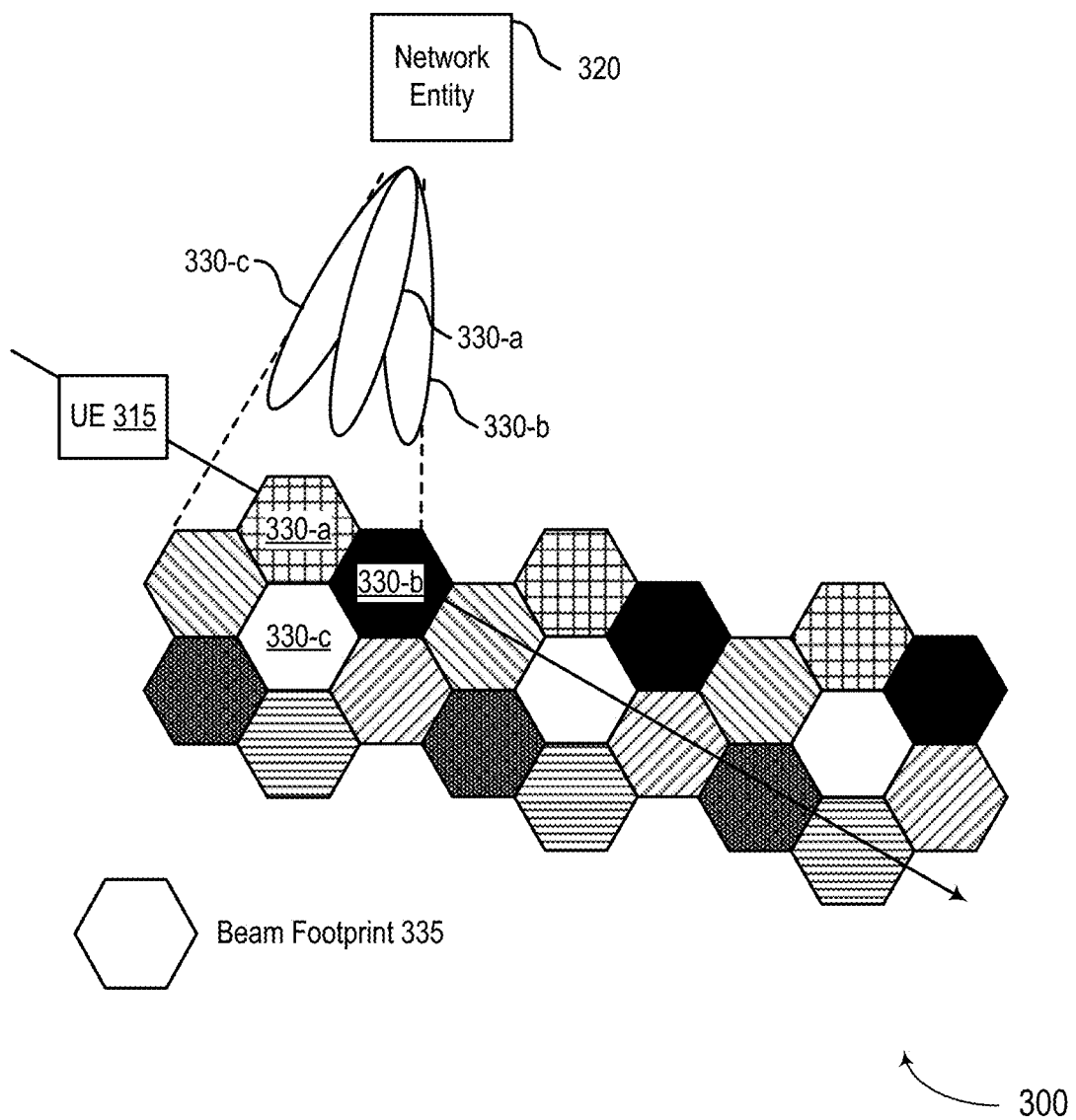
FIG. 3 is a diagram illustrating an example of a wireless communications system that supports one or more bandwidth part (BWP) configurations for communication networks, in accordance with aspects of the present disclosure.

FIG. 3 is a diagram illustrating an example of a wireless communications system 300 that supports one or more bandwidth part (BWP) configurations for communication networks, in accordance with aspects of the present disclosure. In some examples, the wireless communications system 300 may implement aspects of the wireless network 100 described with respect to FIG. 1. The wireless communications system 300 may include a network entity 320 and a UE 315, which may be an example of a UE 120 as described with respect to FIG. 1. The network entity 320 may be a non-terrestrial entity, such as a satellite or a high-altitude platform station (HAPS). Alternatively, the network entity 320 may be a base station, such as the base station 110 described with respect to FIG. 1. As such, the wireless communications system 300 may be an example of a non-terrestrial network (NTN), a terrestrial network, or a combination of an NTN and a terrestrial network.

In some wireless communication environments, beam switching may be frequent relative to other environments. In some cases, as illustrated in FIG. 3, a network entity 320 may communicate with a UE 315 via a beam 330, which may be a directional beam. The beam 330 may have a beam footprint 335 (e.g., a coverage area of the beam 330). For example, the network entity 320 may communicate with the UE 315 via a first beam 330-a. Additionally, or alternatively, the network entity 320 may use a second beam 330-b or a third beam 330-c for communications. The UE 315 may, in some examples, derive a beam footprint shape (e.g., hexagonal, circular, elliptical, or the like) based on the shape and structure of the antenna associated with the beam 330. In some other examples, the UE 315 may derive a beam size based on one or more power levels associated with the beam 330. The shape and size of the beam footprint 335 may depend on the distance of the transmitting device (e.g., network entity 320) from the surface of the Earth, the transmitting angle, and the like. Further, footprints that are adjacent may have different shapes and sizes dependent on the transmission angle and distance of the transmitting device. In some cases, the beam footprints 335 may overlap. The beam footprint 335 may be small relative to the speed of the network entity 320. In some other examples, the frequency of beam switching may depend on the mobility of the UE 315 and/or the mobility of the UE 315 in combination with movement of a base station.

The network entity 320 may configure each beam 330 from a satellite (not shown) as a cell with an initial BWP per beam (e.g., an initial uplink BWP, an initial downlink BWP, or an uplink BWP and downlink BWP pair). Each pattern of the beam footprint 335 in FIG. 3 may represent a different initial BWP. In some cases, each beam 330 may be associated with one or more BWPs in addition to the initial BWP, which the UE 315 and the network entity 320 may use to communicate. The network (e.g., network entity 320) may signal to the UE 315 which BWP to utilize as the beam footprints 335 move or the UE 315 moves.

In some cases, one or more BWPs may be configured for a non-terrestrial beam 330 (e.g., satellite beam) for each UE 315. Each beam 330 may be configured with an initial uplink bandwidth part and an initial downlink bandwidth part. Each beam 330 may also be configured with a default uplink bandwidth part and a default downlink bandwidth part for a UE 315. Additional bandwidth parts may be configured for each satellite beam 330. As noted, the network entity 320 may configure BWPs in a beam 330 for the UE 315. The UE 315 may switch BWPs during a BWP switching operation, such as an inter-beam switch or an intra-beam switch. For inter-beam switching, a UE 315 may switch from a BWP in a first beam 330-*a* to a BWP in a second beam 330-*b*. For example, if the UE 315 moves from a beam footprint 335 associated with first beam 330-*a* to a beam footprint 335 associated with the second beam 330-*b*, the UE may switch from a BWP in the first beam 330-*a* to a BWP in the second beam 330-*b*. For intra-beam BWP switching, a UE 315 may switch from a BWP to a different BWP in the same beam 330. For example, if the UE 315 performs a BWP switching operation without leaving the beam footprint 335 associated with the first beam 330-*a*, the UE 315 may switch from a BWP associated with the first beam 330-*a* to another BWP associated with the first beam 330-*a*. In some examples, the network entity 320 may configure the one or more beams 330 as a single cell. In other examples, the network entity 320 may configure the one or more beams 330 as separate cells or as multiple cells. That is, each cell may include one or more beams 330 corresponding to beam footprints 335.

In some examples, the UE 315 may determine a beam 330 to use for communication based on monitoring for a broadcast message from the satellite. For example, the satellite may broadcast one or more synchronization signal blocks (SSBs) to one or more UEs 315. The UE 315 may detect an SSB, which may include a master information block (MIB), a system information block (SIB) (e.g., a first type of SIB (SIB1)), or both. The UE 315 may decode the MIB to identify one or more parameters that may be used to detect and decode the SIB1. For example, the one or more parameters may include a bandwidth, a control resource set (CORESET), a search space, other parameters related to resource allocation, or a combination associated with the SIB1. In some examples, the SIB1 may include location information (e.g., a pointer) corresponding to a second type of SIB (SIB2). The SIB2 may include one or more configurations for BWPs associated with a beam 330 used for communication with the network entity 320. Additionally or alternatively, the UE 315 may receive RRC signaling indicating the one or more configurations for the BWPs associated with the beam 330.

Due to the high mobility of the UE 315 relative to the network entity 320, the UE 315 may frequently switch BWPs associated with one or more beams 330. As illustrated in FIG. 3, the UE 315 may traverse seven different beam footprints 335, and may perform multiple BWP switching operations based on traversing the beam footprints 335. For example, the UE 315 may perform a BWP switching operation to switch from BWPs associated with the first beam 330-*a*, second beam 330-*b*, or both, based on a BWP configuration and the trajectory of the UE 315. Additionally, or alternatively, the UE 315 may switch to a different cell based on traversing the beam footprints 335. For example, the beam footprints 335 associated with the first beam 330-*a*, second beam 330-*b*, and third beam 330-*c* may be associated with a first cell, however the other beam footprints 335 may be associated with different cells. Additionally or alternatively, beam footprints 335 associated with the first beam 330-*a*, second beam 330-*b*, and third beam 330-*c* may be associated with different cells.

In some cases, a UE 315 may switch beams 330 within a coverage area of a network entity 320 or when moving from a first coverage area to a second coverage area. For example, the UE 315 may move from a beam footprint 335 associated with the first beam 330-*a* to a beam footprint 335 associated with the second beam 330-*b*. In such examples, the UE 315 may be communicating with the network entity 320 on a second BWP, and may switch from the first beam 330-*a* to the second beam 330-*b* upon crossing into the beam footprint 335 for the second beam 330-*b*. Because of the beam switch, the UE 315 may also switch from the second BWP to a first BWP. Similarly, the UE 315 may switch from the second beam 330-*b* to another beam 330. The beam switch may be a result of movement by the UE 315, movement or handover by a network entity 320, or a combination thereof. In some examples, the UE 315 may switch from the first beam 330-*a* to the second beam 330-*b* based on a beam selection or beam refinement procedure, or based on detected interference or degraded signal quality on the first beam 330-*a*.

In some cases, the UE 315 may use multiple BWP configurations corresponding to BWPs associated with a new beam in a BWP switching procedure, which may cause high signaling volume and inefficient resource allocation at the UE 315 (e.g., due to BWP configuration signaling). In some examples, the UE 315 may receive one or more configurations for BWPs from a network entity 320 (e.g., after performing a beam switching operation from the first beam 330-*a* to the second beam 330-*b*). The UE 315 may receive BWP configurations corresponding to BWPs in the first beam 330-*a*, BWPs in a different beam 330, such as the second beam 330-*b*, or BWPs in a beam 330 from a different network entity 320. The BWP configuration may include a frequency shift (e.g., based on a reference BWP) or a time delay associated with the BWP switching procedure.

Figure 4:
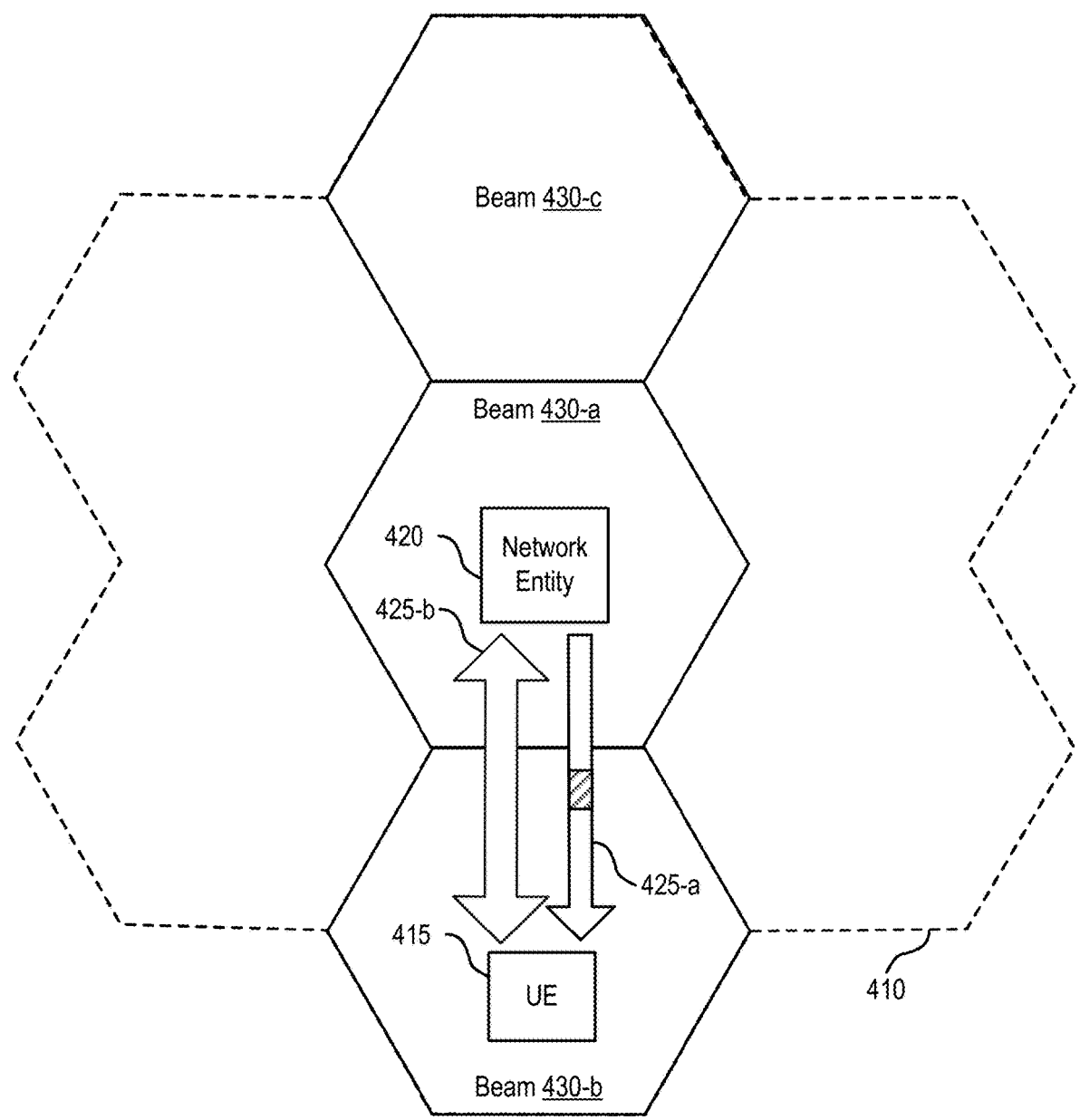
FIG. 4 is a diagram illustrating an example of a wireless communications system that supports bandwidth part (BWP) configuration for communication networks, in accordance with aspects of the present disclosure.

FIG. 4 illustrates an example of a wireless communications system 400 that supports bandwidth part (BWP) configuration for wireless communication networks in accordance with aspects of the present disclosure. In some examples, the wireless communications system 400 may implement aspects of the wireless network 100, wireless communications system 300, or both. The wireless communications system 400 may include a network entity 420, a UE 415, beams 430, beam footprints 435, and communication links 425. The network entity 420 may be an example of the network entity 320 as described with respect to FIG. 3. The wireless communications system 400 may be an example of a non-terrestrial network (NTN), a terrestrial network, or a combination of an NTN and a terrestrial network.

In some cases, a coverage area 410 of the network entity 420 may include multiple beam footprints 435 corresponding to one or more beams 430 configured at the network entity 420 for communicating with one or more UEs 415. For example, the network entity 420 may use multiple antennas (not shown) to form one or more beams 430 (e.g., narrow beams) for communication with one or more UEs 415. The beams 430 may operate on different frequency intervals (e.g., different BWPs) to reduce interference among the beams 430. That is, a first beam 430-*a* may operate using different BWPs than a second beam 430-*b*. In some examples, the network entity 420 may communicate with the UE 415 via one or more communication links 425 using the beams 430. For example, the network entity 420 may transmit a message including control information to the UE 415 via a communication link 425-*a*, which may be used for downlink communications, while the UE 415 and the network entity 420 may communicate using a communication link 425-*b*, which may be used for uplink or downlink communications. The network entity 420 and the UE 415 may use the first beam 430-*a* for both uplink and downlink communications.

The network entity 420 and the UE 415 may be thousands of kilometers apart, and it may take some time for electromagnetic waves to propagate over the distance between the network entity 420 and the UE 415. The propagation delay for NTNs may be many orders of magnitude larger than the propagation delay for terrestrial networks. By way of example, the network entity 420 may be in an orbit, such as low Earth orbit, medium Earth orbit, other non-geostationary Earth orbit, or geostationary Earth orbit. In any of these examples, the network entity 420 may be many thousands of kilometers from Earth, and therefore may be thousands of kilometers from the UE 415. The distance that a transmission travels may result in substantial signal degradation due to, for example, atmospheric effects, interference from other radio frequency sources, signal attenuation due to vegetation or structures, and the like.

Further, due to the high mobility of the UE 415 relative to the network entity 420, the UE 415 may frequently switch BWPs associated with one or more beams 430. For example, the UE 415 may perform a BWP switching operation to switch from BWPs associated with the first beam 430-*a*, second beam 430-*b*, or both based on a BWP configuration 440. In some examples, the BWP configuration 440 may include information such as a frequency location and bandwidth, a subcarrier spacing, a cyclic prefix duration, a control resource set (CORESET), a search space for a downlink control channel (e.g., a physical downlink control channel (PDCCH)), a time-domain resource allocation for a downlink shared channel (e.g., a starting time and duration for a physical downlink shared channel (PDSCH)), or a combination. The information in the BWP configuration 440 may take up a relatively large number of bits in a message. In some cases, the UE 415 may use multiple BWP configurations 440 corresponding to BWPs associated with a new beam in the beam switching procedure, which may cause high signaling volume and inefficient resource allocation at the UE 415 (e.g., due to BWP configuration signaling in cell search operations).

In some examples, the UE 415 may receive one or more configurations for BWPs from a network entity 420 (e.g., after performing a beam switching operation from the first beam 430-*a* to the second beam 430-*b*). For example, the UE 415 may receive a BWP configuration 440 from the network entity 420 via the communication link 425-*a*. The UE 415 may receive BWP configurations corresponding to BWPs in the first beam 430-*a*, BWPs in a different beam 430, such as the second beam 430-*b*, or BWPs in a beam 430 from a different network entity 420. The network entity 420 may send the bandwidth part configuration 440 using a SIB1, another SIB, or an RRC message, for example.

In some cases, the BWPs may be initial BWPs. For example, the network entity 420 may configure multiple initial downlink BWPs, multiple initial uplink BWPs, or both for each cell, where each cell may include one or more beams 430. Each beam 430 may share an initial downlink BWP, an initial uplink BWP, or both with another beam 430. For example, the second beam 430-*b* may share initial BWPs with a third beam 430-*c* with relatively low interference (e.g., because the second beam 430-*b* and third beam 430-*c* are relatively far apart).

In some cases, the BWP configuration 440 may include a BWP configuration 440 for each BWP associated with the second beam 430-*b*. In some other cases, the BWP configuration 440 (e.g., including a downlink BWP or an uplink BWP configuration) may correspond to a reference BWP. In some cases, the reference BWP may be within the first beam 430-*a*. For example, a downlink BWP, an uplink BWP, or both, of the first beam 430-*a* may be configured with reference to another downlink BWP, another uplink BWP, or both, of the first beam 430-*a*. Additionally, or alternatively, the reference BWP may be within a different beam 430 (e.g., second beam 430-*b*). In some cases, the different beam may be from the network entity 420 or another network entity 420. That is, one or more BWPs associated with the first beam 430-*a* from the network entity 420 may be configured with reference to another BWP associated with a beam 430 from a different network entity 420. In some examples, the network entity 420 may determine a downlink BWP has information elements (IEs) that are the same as IEs corresponding to a reference downlink BWP. The network entity 420 may refrain from transmitting the IEs to the UE 415 in the BWP configuration 440 and may indicate an identifier of the reference downlink BWP, and may additionally indicate which IEs are the same.

In some other cases, the BWP configuration 440 (e.g., including a downlink BWP or an uplink BWP configuration) may correspond to a shared partial BWP.

As described above, a UE and a non-terrestrial entity may transmit control information or data messages using one or more beams associated with one or more bandwidth parts (BWPs). In some examples, the non-terrestrial entity may be an example of a satellite or a high altitude platform station (HAPS). Due to the distance between the non-terrestrial entity and the UE, a transmission from the non-terrestrial entity may be degraded. Due to beam degradation, a UE may switch satellite beams, perform an intra-beam BWP transition, or an inter-beam BWP transition.

As described above, each beam of a non-terrestrial entity, such as satellite beams, maps to a cell. In non-terrestrial networks (NTN), a satellite may use multiple antennas to form multiple narrow beams. As described, the beams (e.g., satellite beams) may operate on disjointed frequency intervals (e.g., different BWPs) to mitigate interference among the satellite beams.

Figures 5A, 5B, 5C:
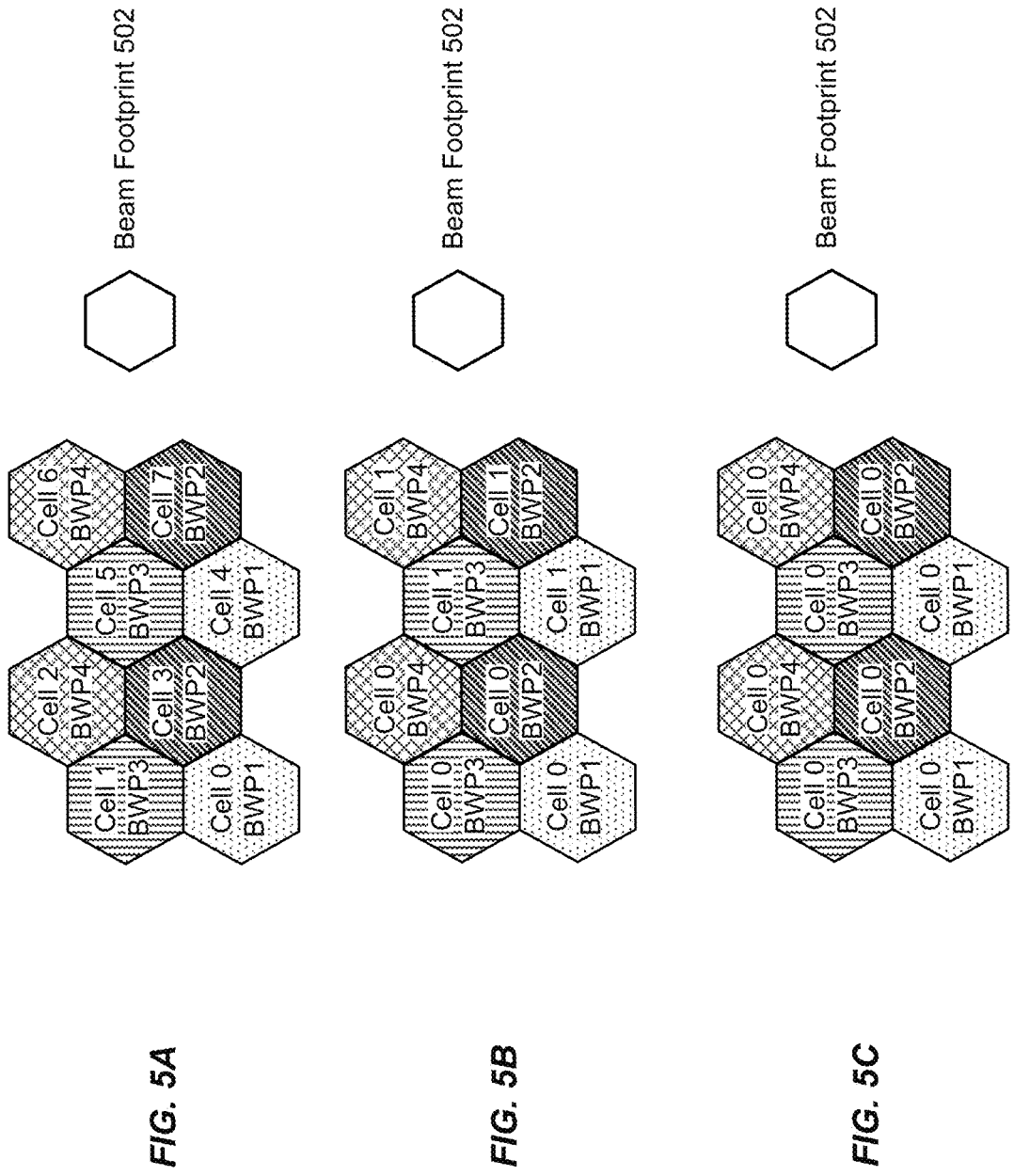
FIGS. 5A, 5B, and 5C are block diagrams illustrating examples of cell configurations, in accordance with aspects of the present disclosure.

FIG. 5A is a block diagram illustrating an example of a cell configuration, according to aspects of the present disclosure. As shown in FIG. 5A, each beam may be configured as a separate cell (shown as Cell 0-Cell 7 in FIG. 5A). Each cell corresponds to one BWP of multiple BWPs (shown as BWP1-BWP4 in FIG. 5A). FIG. 5B is a block diagram illustrating another example of a cell configuration, according to aspects of the present disclosure. As shown in FIG. 5B, the beams may be configured as a group of cells (shown as Cell 0 and Cell 1 in FIG. 5B). Each cell corresponds to one BWP of multiple BWPs (shown as BWP1-BWP4 in FIG. 5B). FIG. 5C is a block diagram illustrating another example of a cell configuration, according to aspects of the present disclosure. As shown in FIG. 5C, the beams may be configured as one cell (shown as Cell 0 in FIG. 5C). Each cell corresponds to one BWP of multiple BWPs (shown as BWP1-BWP4 in FIG. 5C). In FIGS. 5A-5C, each cell has a beam footprint 502. For each satellite beam, more than one BWP may be configured within the frequency interval. For example, multiple BWPs may be configured to accommodate different UE capabilities.

In addition to, or alternate from, switching due to beam degradation, a UE may perform a switch due to non-terrestrial entity mobility (e.g., movement of a satellite). That is, due to non-terrestrial entity mobility, a UE may switch satellite beams, perform an intra-beam BWP transition, or an inter-beam BWP transition. Therefore, the UE may be configured with multiple BWP configurations to enable switching.

One or more BWP configurations may be signaled to the UE. In some cases, a BWP configuration configures multiple parameters. The selection or activation of a particular parameter may be indicated via control signaling, such as downlink control information (DCI), a medium access control (MAC) control element (CE), or radio resource control (RRC) signaling. For example, the BWP configuration may configure multiple time-domain resource allocation patterns for downlink shared channels, and one of the configured time-domain resource allocation patterns may be selected via DCI signaling.

As described, the multiple BWP configurations may increase signaling and increase resources used by the UE. Therefore, it is desirable to improve BWP configuration signaling. Aspects of the present disclosure reduce BWP configuration signaling by providing a message including a BWP configuration for reconstructing a BWP.

According to aspects of the present disclosure, a UE receives a configuration for reconstructing a BWP of a beam for a non-terrestrial entity. The configuration for reconstructing the BWP may be referred to as a BWP configuration. The BWP configuration may be a shared partial BWP configuration, a reference BWP configuration, or an initial BWP configuration. The shared partial BWP configuration is described in more detail below. The reference configuration refers to the BWP being configured based on a difference from a complete configuration of a reference BWP. The initial BWP configuration refers to configuring from scratch.

The UE may reconstruct a BWP of the multiple BWPs based on the BWP configuration. Furthermore, the UE may switch from a current BWP to the reconstructed BWP to communicate with the non-terrestrial entity. The BWP configuration may be received in a radio resource control (RRC) message or a system information block (SIB) message, for example.

The BWP configuration may be for a first non-terrestrial beam from the non-terrestrial entity. In one configuration, the non-terrestrial entity is currently serving the UE via the first non-terrestrial beam. In another configuration, the non-terrestrial entity is currently serving the UE via a second non-terrestrial beam, and the first non-terrestrial beam is one of multiple non-terrestrial beams of the non-terrestrial entity. In another configuration, the non-terrestrial entity is not serving the UE at a time when the BWP configuration is received. For example, the beam may be from another satellite.

In some implementations, the BWP configuration is a shared partial BWP configuration. The shared partial BWP configuration may provide one or more downlink beam parameters and uplink beam parameters. For example, a downlink (DL) BWP parameter (e.g., configuration) may include a frequency location and a bandwidth, a subcarrier spacing (SCS), a cyclic prefix (CP) duration, a control resource set (CORSET) indication, and a search space indication. Uplink (UL) BWP parameters may include, for example, a frequency location and a bandwidth, a subcarrier spacing, a cyclic prefix duration, cell specific uplink control channel resources, and an uplink shared channel configuration.

According to aspects of the present disclosure, the shared partial BWP configuration may be a building block for configuring one or more BWPs for the UE. The BWP may be configured as a combination of the shared partial BWP configuration, one or more parameters that were not included in the shared partial BWP configuration, and/or a transformation.

Figure 6:
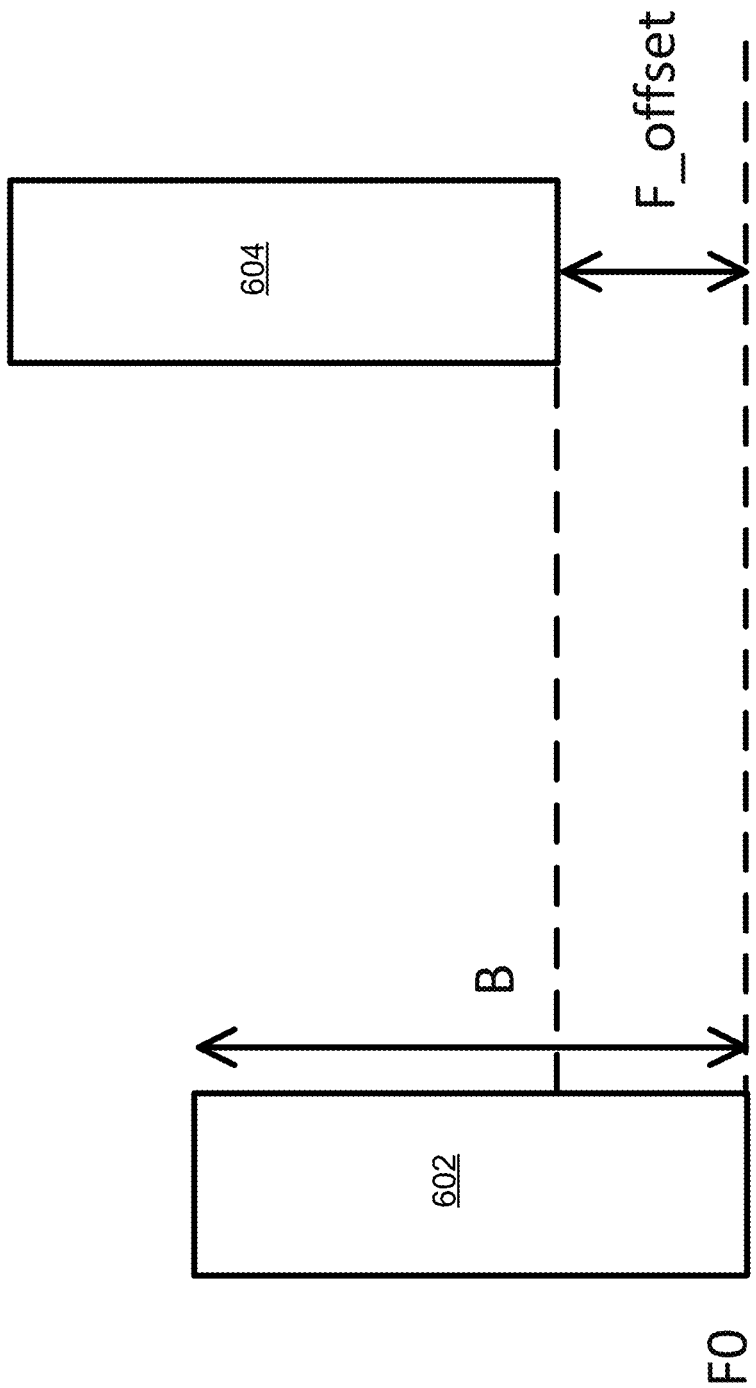
FIG. 6 is a diagram illustrating an example of applying a frequency offset to a frequency location and bandwidth configuration, in accordance with aspects of the present disclosure.

In some implementations, the transformation may include a frequency offset applied to a frequency location and bandwidth configuration indicated in the shared partial BWP configuration. FIG. 6 is a diagram illustrating an example of applying a frequency offset to a frequency location and bandwidth configuration, according to aspects of the present disclosure. As shown in FIG. 6, a frequency (shown as F0) and a bandwidth (shown as B) are obtained from the shared BWP configuration. A first bandwidth part 602 is based on the shared BWP configuration. A frequency offset (shown as F_offset) is applied to the frequency (F0) to obtain a transformed frequency. A second BWP 604 is derived from the shared BWP configuration and the frequency offset.

In some configurations, the shared partial BWP configuration is associated with an identifier. Multiple shared partial BWP configurations may be configured for a UE. The network may identify which shared partial BWP configuration should be used by signaling the identifier.

In some implementations, the shared partial BWP configuration may be a combination of a shared common part and a shared dedicated part. The shared common part (e.g., shared among BWPs) is split from a common part of the shared partial BWP configuration that is unique to a BWP (e.g., not shared among BWPs). The shared dedicated part is split from a dedicated part of the shared partial BWP configuration unique to the BWP.

For a downlink BWP configuration, the shared common part may include, for example, a frequency location and bandwidth, a subcarrier spacing, a cyclic prefix duration, a downlink control channel resources (e.g., CORESET zero), and/or a search space configuration (e.g., search space zero). The shared common part that may be unique to the UE may include time-domain resource allocation patterns for downlink shared channels (e.g., physical downlink shared channels (PDSCHs)). The shared dedicated part may include the semi-persistent scheduling (SPS) configuration or the UE specific control channel resources. The shared dedicated part unique to the UE may include a radio link monitoring configuration.

For an uplink BWP configuration, the shared common part may include, a frequency location and bandwidth, a subcarrier spacing, cyclic prefix duration, or cell specific uplink control channel (e.g., physical uplink control channel (PUCCH)) resources. The shared common part unique to the BWP may include random access parameters. The shared dedicated part may include a shared uplink channel (e.g., physical uplink shared channel (PUSCH) configuration. The shared dedicated part unique to the BWP may include a sounding reference signal (SRS) configuration.

As described above, the shared partial BWP configuration may be associated with an identifier. In this case, the network configures a particular shared partial BWP configuration by signaling an identifier. Additionally, the shared partial BWP configuration may comprise a common part and a dedicated part. TABLE 1 provides examples of identifiers (IDs) for information elements for a downlink BWP configuration. As shown in TABLE 1, the IDs may include a BWP identifier (shown as bwp-Id), a shared common downlink part (shown as bwp-Common-shared-Id), a unique common downlink part (shown as bwp-Common), a shared dedicated part (shown as bwp-Dedicated-shared-Id), and a unique dedicated part (shown as bwp-Dedicated).

TABLE 1

| | |
|---|---|
| BWP-Downlink ::= | SEQUENCE { |
| bwp-Id | BWP-Id, |
| bwp-Common-shared-Id | BWP-DownlinkCommon-Shared-Id |
| bwp-Common | BWP-DownlinkCommon-Not-Shared |
| bwp-Dedicated-shared-Id | BWP-DownlinkDedicated-Shared-Id |
| bwp-Dedicated | BWP-DownlinkDedicated-Not-Shared |
| ...} | |

In TABLE 1, BWP-DownlinkCommon-Shared-Id is an identifier for an information element (BWP-DownlinkCommon-Shared) that defines information elements included in the shared common part. Additionally, BWP-DownlinkDedicated-Shared-Id is an identifier for an information element (BWP-DownlinkDedicated-Shared) that defines information elements included in the shared dedicated part. BWP-DownlinkCommon-Not-shared defines information elements that are not included in the information elements corresponding to BWP-DownlinkCommon-Shared. In some examples, the ID BWP-Common-Shared-Id is not included in the BWP configuration. In this example, this BWP-DownlinkCommon-Not-shared reduces to BWP-Downlink-Common.

In some implementations, a timing threshold is associated with two BWPs for BWP switching operations. The timing threshold may be referred to as a BWP switch delay. In these implementations, the switch (e.g., transformation) from a first BWP to a second BWP should occur before expiration of the timing threshold. A value of the timing threshold may be set to a first value if the UE switches between two BWPs that have a same partial BWP configuration. The value of the timing threshold may be set to a second value if the UE switches between two BWPs that have different shared partial BWP configurations. The first value may be less than or equal to the second value. The value of the timing threshold may also depend on information elements included in the shared partial BWP configuration. The value of the timing threshold may also depend on whether a beam of the first BWP is different from the beam of the second BWP (e.g., whether a BWP switch is intra-beam or inter-beam). The value of the timing threshold may further depend on UE capability.

As indicated above, FIGS. 3-6 are provided as examples. Other examples may differ from what is described with respect to FIGS. 3-6.

Figure 7:
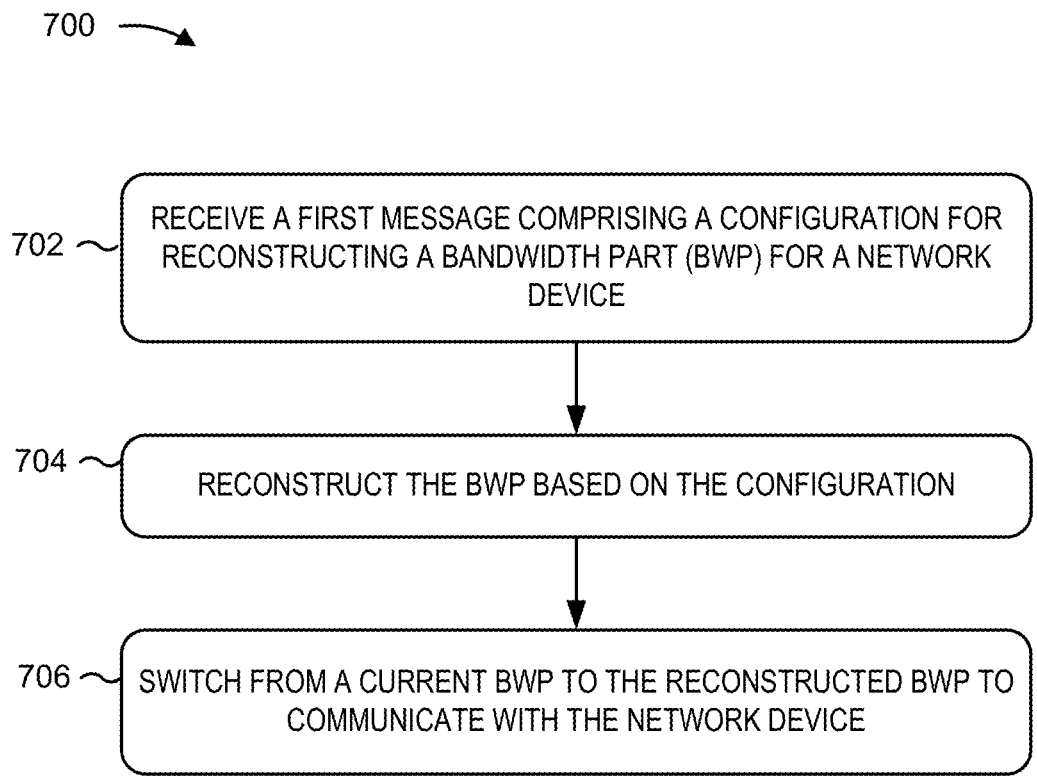
FIG. 7 is a diagram illustrating an example process performed, for example, by a user equipment (UE), in accordance with various aspects of the present disclosure.

FIG. 7 is a diagram illustrating an example process 700 performed, for example, by a UE, in accordance with various aspects of the present disclosure. The process 700 is an example of bandwidth part (BWP) configuration with a shared partial configuration for non-terrestrial networks (NTNs).

As shown in FIG. 7, in some aspects, the process 700 may include receiving a first message comprising a configuration for reconstructing a bandwidth part (BWP) for a network device (block 702). For example, the UE (e.g., using the antenna 252, DEMOD/MOD 254, MIMO detector 256, receive processor 258, controller/processor 280, and/or memory 282) may receive the first message. The network device may be a non-terrestrial entity and the BWP may be used for a first non-terrestrial beam of the non-terrestrial entity. The configuration may indicate a transformation of the BWP. The BWP configuration may be a shared partial BWP configuration, which may include a shared common part and a shared dedicated part. The configuration may also be a reference BWP configuration or an initial BWP configuration. The shared partial BWP configuration may provide one or more downlink beam parameters and uplink beam parameters. For example, a downlink (DL) BWP parameter (e.g., configuration) may include a frequency location and a bandwidth, a subcarrier spacing (SCS), a cyclic prefix (CP) duration, a control resource set (CORSET) indication, and a search space indication. Uplink (UL) BWP parameters may include, for example, a frequency location and a bandwidth, a subcarrier spacing, a cyclic prefix duration, cell specific uplink control channel resources, and an uplink shared channel configuration.

As shown in FIG. 7, in some aspects, the process 700 may include reconstructing the BWP based on the configuration (block 704). For example, the UE (e.g., using the antenna 252, DEMOD/MOD 254, MIMO detector 256, TX MIMO processor 266, receive processor 258, transmit processor 264, controller/processor 280, and/or memory 282) may reconstruct the BWP based on the configuration. The BWP may be configured as a combination of the shared partial BWP configuration, one or more parameters that were not included in the shared partial BWP configuration, and/or a transformation.

In some aspects, the process 700 may include switching from a current BWP to the reconstructed BWP to communicate with the network device (block 706). For example, the UE (e.g., using the antenna 252, DEMOD/MOD 254, MIMO detector 256, TX MIMO processor 266, receive processor 258, transmit processor 264, controller/processor 280, and/or memory 282) may switch from a current BWP to the reconstructed BWP to communicate with the non-terrestrial entity. For example, the switch may occur as a result of beam degradation, or due to non-terrestrial entity mobility (e.g., movement of a satellite). That is, due to non-terrestrial entity mobility, a UE may switch satellite beams, perform an intra-beam BWP transition, or an inter-beam BWP transition. The UE may be configured with multiple BWP configurations to enable the switching.

Implementation examples are described in the following numbered clauses.

1. A method for wireless communication performed by a user equipment (UE), comprising:
   receiving a first message comprising a configuration for reconstructing a bandwidth part (BWP) for a network device;
   reconstructing the BWP based on the configuration; and
   switching from a current BWP to the reconstructed BWP to communicate with the network device.

2. The method of clause 1, further comprising:
   receiving an indication for transforming the configuration, which is a shared partial BWP configuration; and
   receiving at least one parameter independent of the shared partial BWP configuration.

3. The method of clause 1 or 2, in which the indication for transforming comprises a frequency offset, and reconstructing the BWP comprises applying the frequency offset to a frequency of the shared partial BWP configuration.

4. The method of any of the preceding clauses, in which the shared partial BWP configuration comprises a shared common part and a shared dedicated part.

5. The method of any of the preceding clauses, in which the configuration comprises a shared partial BWP configuration, a reference BWP configuration, or an initial BWP configuration.

6. The method of any of the preceding clauses, in which:
   the configuration is a shared partial BWP configuration; and the BWP is one BWP of a plurality of BWPs.

7. The method of any of the preceding clauses, in which the configuration is a shared partial BWP configuration comprising:
   a downlink (DL) BWP configuration comprising a DL frequency location and a bandwidth for a shared partial DL BWP, a first subcarrier spacing, a first cyclic prefix duration, a control resource set (CORSET) indication, and a search space indication; and
   an uplink (UL) BWP configuration comprising an UL frequency location and a bandwidth for a shared partial UL BWP, a second subcarrier spacing, a second cyclic prefix duration, cell specific UL control channel resources, and an uplink shared channel configuration.
8. The method of any of the preceding clauses, in which:
   the configuration is one shared partial BWP configuration of a plurality of shared BWP configurations; and
   each one of the plurality of shared partial BWP configurations is associated with a unique identifier; and
   the method further comprises receiving the unique identifier for identifying the one shared partial BWP configuration.
9. The method of any of the preceding clauses, further comprising switching to the reconstructed BWP before expiration of a timer.
10. The method of any of the preceding clauses, in which the timer comprises:
    a first value when the current BWP and the reconstructed BWP have a same shared partial BWP configuration; or
    a second value when the current BWP and the reconstructed BWP have different shared partial BWP configurations, the first value being equal to or less than the second value.
11. The method of any of the preceding clauses, in which a value of the timer is further based on at least one of information elements of the shared partial BWP configuration of the reconstructed BWP, whether switching from the current BWP to the reconstructed BWP is an intra-beam switch or an inter-beam switch, a UE capability, or a combination thereof.
12. The method of any of the preceding clauses, in which the network device comprises a non-terrestrial entity and the BWP is used on a first non-terrestrial beam of the non-terrestrial entity.
13. The method of any of the preceding clauses, in which:
    the non-terrestrial entity is currently serving the UE via the first non-terrestrial beam;
    the non-terrestrial entity is currently serving the UE via a second non-terrestrial beam and the first non-terrestrial beam is one of a plurality of non-terrestrial beams of the non-terrestrial entity; or
    the non-terrestrial entity is not serving the UE at a time when the first message is received.
14. The method of any of the preceding clauses, in which the non-terrestrial entity comprises a high-altitude platform station (HAPS) or a satellite.
15. The method of any of the preceding clauses, in which the first message comprises a radio resource control (RRC) message or a system information block (SIB) message.
16. An apparatus for wireless communications performed by a user equipment (UE), comprising:
    a processor,
    memory coupled with the processor; and
    instructions stored in the memory and operable, when executed by the processor, to cause the apparatus:
    to receive a first message comprising a configuration to reconstruct a bandwidth part (BWP) for a network device;
    to reconstruct the BWP based on the configuration; and
    to switch from a current BWP to the reconstructed BWP to communicate with the network device.
17. The apparatus of clause 16, in which the processor causes the apparatus:
    to receive an indication to transform the configuration, which is a shared partial BWP configuration; and
    to receive at least one parameter independent of the shared partial BWP configuration.
18. The apparatus of clause 16 or 17, in which:
    the indication for transforming comprises a frequency offset; and
    the processor causes the apparatus to reconstruct the BWP by applying the frequency offset to a frequency of the shared partial BWP configuration.
19. The apparatus of any of the clauses 16-18, in which the shared partial BWP configuration comprises a shared common part and a shared dedicated part.
20. The apparatus of any of the clauses 16-19, in which the configuration comprises a shared partial BWP configuration, a reference BWP configuration, or an initial BWP configuration.
21. The apparatus of any of the clauses 16-20, in which:
    the configuration is a shared partial BWP configuration; and
    the BWP is one BWP of a plurality of BWPs.
22. The apparatus of any of the clauses 16-21, in which the configuration is a shared partial BWP configuration comprising:
    a downlink (DL) BWP configuration comprising a DL frequency location and a bandwidth for a shared partial DL BWP, a first subcarrier spacing, a first cyclic prefix duration, a control resource set (CORSET) indication, and a search space indication; and
    an uplink (UL) BWP configuration comprising an UL frequency location and a bandwidth for a shared partial UL BWP, a second subcarrier spacing, a second cyclic prefix duration, cell specific UL control channel resources, and an uplink shared channel configuration.
23. The apparatus of any of the clauses 16-22, in which:
    the configuration is one shared partial BWP configuration of a plurality of shared BWP configurations;
    each one of the plurality of shared partial BWP configurations is associated with a unique identifier; and
    the processor causes the apparatus to receive the unique identifier to identify the one shared partial BWP configuration.
24. The apparatus of any of the clauses 16-23, in which the processor causes the apparatus to switch to the reconstructed BWP before expiration of a timer.
25. The apparatus of any of the clauses 16-24, in which the timer comprises:
    a first value when the current BWP and the reconstructed BWP have a same shared partial BWP configuration; or
    a second value when the current BWP and the reconstructed BWP have different shared partial BWP configurations, the first value being equal to or less than the second value.

26. The apparatus of any of the clauses 16-25, in which a value of the timer is further based on at least one of information elements of the shared partial BWP configuration of the reconstructed BWP, whether switching from the current BWP to the reconstructed BWP is an intra-beam switch or an inter-beam switch, a UE capability, or a combination thereof.
27. The apparatus of any of the clauses 16-26, in which the network device comprises a non-terrestrial entity and the BWP is used on a first non-terrestrial beam of the non-terrestrial entity.
28. The apparatus of any of the clauses 16-27, in which:
    the non-terrestrial entity is currently serving the UE via the first non-terrestrial beam;
    the non-terrestrial entity is currently serving the UE via a second non-terrestrial beam and the first non-terrestrial beam is one of a plurality of non-terrestrial beams of the non-terrestrial entity; or
    the non-terrestrial entity is not serving the UE at a time when the first message is received.
29. The apparatus of any of the clauses 16-28, in which the non-terrestrial entity comprises a high-altitude platform station (HAPS) or a satellite.
30. The apparatus of any of the clauses 16-29, in which the first message comprises a radio resource control (RRC) message or a system information block (SIB) message.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:
1. An apparatus for wireless communications, comprising:
   at least one processor,
   at least one memory coupled with the at least one processor; and
   instructions stored in the at least one memory and operable, when executed by the at least one processor, to cause the apparatus to:
      receive a message comprising a configuration, the configuration comprising a shared partial bandwidth part (BWP) configuration or a reference BWP configuration, a BWP associated with the reference BWP configuration being based on a difference relative to a reference BWP associated with the reference BWP configuration;
      transform the configuration in response to the configuration being the shared partial BWP configuration;
      reconstruct a BWP based on either the transformed configuration or the reference BWP configuration; and
      switch from a current BWP to the reconstructed BWP.
2. The apparatus of claim 1, in which:
   the at least one processor causes the apparatus to reconstruct the BWP by applying a frequency offset to a frequency of the shared partial BWP configuration.
3. The apparatus of claim 1, in which the shared partial BWP configuration comprises a shared common part and a shared dedicated part.
4. The apparatus of claim 1, in which at least one of:
   the configuration is a shared partial BWP configuration; or
   the BWP is one BWP of a plurality of BWPs.
5. The apparatus of claim 1, in which the configuration is a shared partial BWP configuration comprising:
   a downlink (DL) BWP configuration comprising at least one of a DL frequency location and a bandwidth for a shared partial DL BWP, a first subcarrier spacing, a first cyclic prefix duration, a control resource set (CORSET) indication, or a search space indication; and
   an uplink (UL) BWP configuration comprising at least one of an UL frequency location and a bandwidth for a shared partial UL BWP, a second subcarrier spacing, a second cyclic prefix duration, cell specific UL control channel resources, or an uplink shared channel configuration.
6. The apparatus of claim 1, in which:
   the configuration is one shared partial BWP configuration of a plurality of shared BWP configurations;
   each of the plurality of shared partial BWP configurations is associated with a unique identifier; and the at least one processor further causes the apparatus to receive the unique identifier.

7. The apparatus of claim 1, in which the at least one processor causes the apparatus to switch to the reconstructed BWP before expiration of a timer.

8. The apparatus of claim 7, in which the timer comprises:
a first value when the current BWP and the reconstructed BWP have a same shared partial BWP configuration; or
a second value when the current BWP and the reconstructed BWP have different shared partial BWP configurations, the first value being equal to or less than the second value.

9. The apparatus of claim 8, in which the first value or the second value is further based on at least one of information elements of the shared partial BWP configuration of the reconstructed BWP, whether switching from the current BWP to the reconstructed BWP is an intra-beam switch or an inter-beam switch, a UE capability, or a combination thereof.

10. The apparatus of claim 1, in which the first message comprises a radio resource control (RRC) message or a system information block (SIB) message.

11. An apparatus for wireless communications, comprising:
at least one processor,
at least one memory coupled with the at least one processor; and
instructions stored in the at least one memory and operable, when executed by the at least one processor, to cause the apparatus to:
receive a message comprising a configuration, the configuration comprising a shared partial bandwidth part (BWP) configuration comprising:
a downlink (DL) BWP configuration comprising at least one of a DL frequency location and a bandwidth for a shared partial DL BWP, a first subcarrier spacing, a first cyclic prefix duration, a control resource set (CORSET) indication, or a search space indication; and
an uplink (UL) BWP configuration comprising at least one of an UL frequency location and a bandwidth for a shared partial UL BWP, a second subcarrier spacing, a second cyclic prefix duration, cell specific UL control channel resources, or an uplink shared channel configuration;
reconstruct a BWP based on the configuration; and
switch from a current BWP to the reconstructed BWP.

12. The apparatus of claim 11, in which the at least one processor further causes the apparatus to transform the configuration, wherein the BWP is reconstructed based on the transformed configuration.

13. The apparatus of claim 11, in which the at least one processor causes the apparatus to reconstruct the BWP by applying a frequency offset to a frequency of the shared partial BWP configuration.

14. The apparatus of claim 11, in which the shared partial BWP configuration comprises a shared common part and a shared dedicated part.

15. The apparatus of claim 11, in which the BWP is one BWP of a plurality of BWPs.

16. The apparatus of claim 11, in which:
the configuration is one shared partial BWP configuration of a plurality of shared BWP configurations;
each of the plurality of shared partial BWP configurations is associated with a unique identifier; and
the at least one processor further causes the apparatus to receive the unique identifier.

17. The apparatus of claim 11, in which the at least one processor causes the apparatus to switch to the reconstructed BWP before expiration of a timer.

18. The apparatus of claim 17, in which the timer comprises:
a first value when the current BWP and the reconstructed BWP have a same shared partial BWP configuration; or
a second value when the current BWP and the reconstructed BWP have different shared partial BWP configurations, the first value being equal to or less than the second value.

19. The apparatus of claim 18, in which the first value or the second value is further based on at least one of information elements of the shared partial BWP configuration of the reconstructed BWP, whether switching from the current BWP to the reconstructed BWP is an intra-beam switch or an inter-beam switch, a UE capability, or a combination thereof.

20. The apparatus of claim 11, in which the first message comprises a radio resource control (RRC) message or a system information block (SIB) message.

21. An apparatus for wireless communications, comprising:
at least one processor,
at least one memory coupled with the at least one processor; and
instructions stored in the at least one memory and operable, when executed by the at least one processor, to cause the apparatus to:
receive a message comprising a configuration, the configuration is one of a plurality of shared partial BWP configurations, each of the plurality of shared partial BWP configurations being associated with a unique identifier;
receive a particular unique identifier;
identify the configuration based on the particular unique identifier;
reconstruct a BWP based on the identified configuration; and
switch from a current BWP to the reconstructed BWP.

22. The apparatus of claim 21, in which the at least one processor further causes the apparatus to transform the identified configuration, wherein the BWP is reconstructed based on the transformed configuration.

23. The apparatus of claim 21, in which the at least one processor causes the apparatus to reconstruct the BWP by applying a frequency offset to a frequency of the shared partial BWP configuration.

24. The apparatus of claim 21, in which the identified shared partial BWP configuration comprises a shared common part and a shared dedicated part.

25. The apparatus of claim 21, in which the BWP is one BWP of a plurality of BWPs.

26. The apparatus of claim 21, in which the identified shared partial BWP configuration comprises:
a downlink (DL) BWP configuration comprising at least one of a DL frequency location and a bandwidth for a shared partial DL BWP, a first subcarrier spacing, a first cyclic prefix duration, a control resource set (CORSET) indication, or a search space indication; and
an uplink (UL) BWP configuration comprising at least one of an UL frequency location and a bandwidth for a shared partial UL BWP, a second subcarrier spacing, a second cyclic prefix duration, cell specific UL control channel resources, or an uplink shared channel configuration.

27. The apparatus of claim 21, in which the at least one processor causes the apparatus to switch to the reconstructed BWP before expiration of a timer.

28. The apparatus of claim 27, in which the timer comprises:
- a first value when the current BWP and the reconstructed BWP have a same shared partial BWP configuration; or
- a second value when the current BWP and the reconstructed BWP have different shared partial BWP configurations, the first value being equal to or less than the second value.

29. The apparatus of claim 28, in which the first value or the second value is further based on at least one of information elements of the shared partial BWP configuration of the reconstructed BWP, whether switching from the current BWP to the reconstructed BWP is an intra-beam switch or an inter-beam switch, a UE capability, or a combination thereof.

30. The apparatus of claim 21, in which the first message comprises a radio resource control (RRC) message or a system information block (SIB) message.

* * * * *